United States Patent [19]

Kalisher

[11] Patent Number: 4,957,231

[45] Date of Patent: Sep. 18, 1990

[54] TACKLE BOX BELT

[76] Inventor: Sheila L. Kalisher, 94 N. Rockledge Dr., Livingston, N.J. 07039

[21] Appl. No.: 421,370

[22] Filed: Oct. 13, 1989

[51] Int. Cl.⁵ .............................................. A45F 5/00
[52] U.S. Cl. ................................... 224/151; 224/240; 224/253; 224/268; 224/901
[58] Field of Search ............... 224/253, 240, 151, 236, 224/224, 907, 268, 269

[56] References Cited

U.S. PATENT DOCUMENTS 1,968,767  7/1934  Howard .............................. 224/253
4,676,419  6/1987  Victor ................................. 224/253
4,819,846  4/1989  Hannemann ........................ 224/901

FOREIGN PATENT DOCUMENTS 250232  8/1947  Switzerland ........................ 224/253

Primary Examiner—Linda J. Sholl
Attorney, Agent, or Firm—Iman Abdallah

[57] ABSTRACT

A portable substitute for the conventional tackle box is provided by the tackle box belt of the present disclosure. The tackle box belt comprises a waist belt to which a plurality of pockets and loop hangers are selectively attached.

4 Claims, 1 Drawing Sheet

TACKLE BOX BELT

BACKGROUND OF THE INVENTION

The present invention generally relates to storage means for fishing accessories. More specifically, the present invention relates to portable carrying means for fishing gear and personal items.

Sport fishermen utilize a broad variety of fishing accessories including numerous hooks, lures, bobbers, sinkers, and fishing lines. Usually these fishing accessories are stored in a tackle box. A well-stocked tackle box can become heavy and difficult to transport, especially when simultaneously transporting fishing rods, coolers and the like. When a fisherman leaves the tackle box on the dock or pier the fishing gear is not readily accessible for quick changes while fishing. If the tackle box is taken out in a boat there is the ever-present danger of it being knocked into the water and the entire contents becoming lost. These accessories often represent a significant financial and emotional investment by the fisherman.

To address the aforementioned problems the prior art discloses fisherman's vests having a plurality of pockets for receipt of the various items of fisherman's gear. Such vests generally restrict complete freedom of movement and are uncomfortable, particularly in warm weather. Furthermore, fisherman's vests come in specific sizes and thus are not adaptable to be worn by persons of distinctively different weight and height.

SUMMARY OF THE INVENTION

An object of the present invention is to provide improved means for storage and transportation of sport fishing accessories.

Another object of the present invention is to provide a carrying device for fishing gear that can be worn about the fisherman's body.

It is also an object of this invention to provide carrying means for fishing accessories which permits selective transportation of small quantities of fishing gear.

Another object of the present invention is to provide adjustable carrying means for fishing accessories that can be worn comfortably by fishermen of varying body sizes.

A still further object of this invention is to provide carrying means for fishing accessories which permits the fisherman to suntan while fishing.

To achieve these and other objects and advantages the present invention discloses a device for portable storage and transportation of fishing accessories comprising a waist belt having a plurality of pockets and loop hangers detachably disposed about the length of said waist belt. The waist belt includes selectively attachable end portions which permit the device to be worn about the waist of fishermen of varying body sizes.

DESCRIPTION OF A PREFERRED EMBODIMENT

Figure 1:
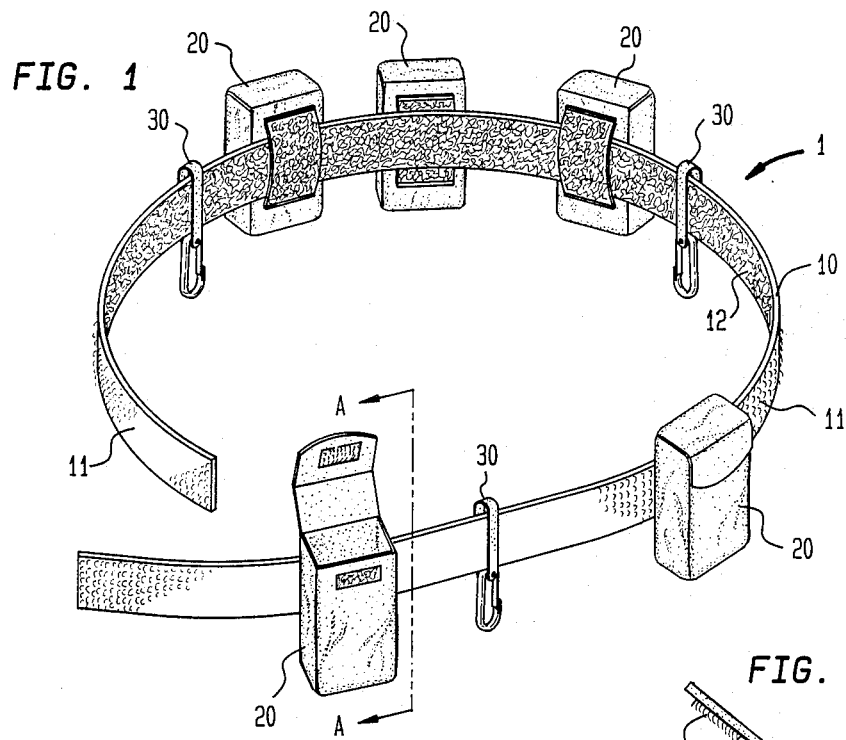
FIG. 1 is a perspective view of the tackle box belt of the present invention.

FIG. 1 illustrates in a perspective view the preferred embodiment of the tackle box belt 1 of the present invention. Tackle box belt 1 generally comprises a waist belt 10, a plurality of pockets 20, said pockets 20 being selectively attachable to said waist belt 10, and a plurality of loop hangers 30, said loop hangers 30 also being selectively attachable to said waist belt 10. The preferred embodiment of waist belt 10 has an outside surface 11 formed from the hook portion of hook and loop tape fastener material, for example Velcro tape, and an inside surface 12 formed from the loop portion of hook and loop tape fastener material. Waist belt 10 may alternatively be formed with the hook portion 11 of hook and loop tape fastener material disposed only on the outside surface for a short length proximate to a first end of said waist belt 10, and the loop portion 12 disposed only on the inside surface for a short length proximate to the opposite second end of said waist belt 10, but the preferred embodiment has the inside and outside surfaces 11 and 12 so formed for the entire length of said waist belt 10 for alternative attachment of the pockets 20 as hereinafter described in greater detail.

Figure 2:
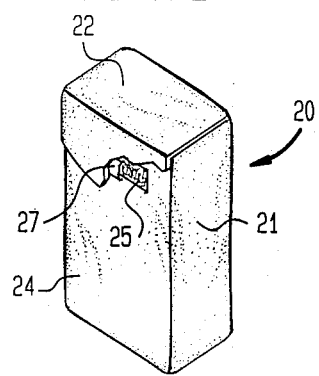
FIG. 2 is a perspective view of the pocket of the present invention.
Figure 3:
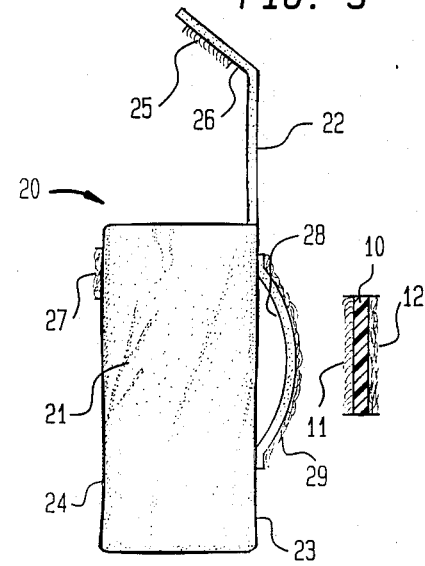
FIG. 3 is a side plan view taken along line A—A of FIG. 1.

Referring now to FIGS. 2 and 3 there is shown a preferred embodiment of the pocket 20 of the present invention. Pocket 20 is preferably formed from waterproof canvas or awning material and comprises a collapsible envelope 21 having an envelope flap 22 integrally formed with the rear portion 23 of said envelope 21. Said envelope flap 22 is selectively fastenable to the front portion 24 of said envelope 21 by means of hook and loop tape fastener material, for example Velcro tape, the hook portion 25 of said tape being fixedly attached to the inside surface 26 of said envelope flap 22 and the loop portion 27 being fixedly attached to the front portion 24 of said envelope 21. As best seen in FIG. 3 pocket 20 includes a casing 28 attached to the rear portion 23 of said envelope 21, the outer surface 29 of said casing 28 being formed from the loop portion of hook and loop tape fastener material. This construction of casing 28 permits the pocket 20 to be alternatively attachable to said waist belt 10 by slidably engaging said waist belt 10 within said casing 28 or by affixing the outer surface 29 of said casing 28 to the outer surface 11 of said waist belt 10.

Figure 4:
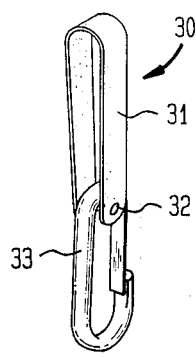
FIG. 4 is a front perspective view of the loop hanger of the present invention.

In FIG. 4 the loop hanger 30 of the present invention can be seen to comprise an open loop 31, preferably formed from leather material, the ends of said open loop 31 being connected by pin means 32 which fixedly attaches the ends of said open loop 31 in spaced relationship. A hanger clip 33 is rotatably disposed about said pin means 32 for attachment of personal items such as a key chain.

The tackle box belt 1 of the present invention provides a simple construction for the storage and transportation of fishing accessories. By utilizing this device a fisherman can avoid the problems associated with the conventional tackle box by wearing the present device around his waist. By selectively placing fishing gear into the pockets 20 and attaching said pockets 20 and loop hangers 30 to the waist belt 10 prior to placing the belt 10 around the fisherman's waist, a fisherman can limit the risk of losing valuable fishing accessories. The loop hangers 30 are attached to waist belt 10 by passing said waist belt 10 through the open loop 31 of said hanger 30. Key chains and other personal items can be attached to the hanger clip 33 for easy access. Pockets 20 can be alternatively attached to said waist belt 10 by slidably engaging the waist belt 10 in the pocket casing 28 or affixing the outer surface 29 of said casing 28 with the outer surface of said waist belt 10. Fishing accessories that will be shared would preferably be placed in a pocket 20 that is affixed rather than slidably engaged so that it can be readily re-attached or attached to another waist belt 10 without removing the belt 10 from the fisherman's waist.

Therefore, in view of the foregoing, I claim:

1. A device for portable storage and transportation of fishing gear and personal items comprising a waist belt having selectively attachable first and second ends, one or a plurality of pockets selectively attachable to said waist belt, and one or a plurality of loop hangers selectively attachable to said waist belt, said waist belt including an outside surface formed from a hook portion of hook and loop fastener material extending for an entire length of said waist belt, and an inside surface formed from a loop portion of hook and loop tape fastener material extending for an entire length of said waist belt, said one or a plurality of pockets comprising a selectively fastenable envelope having a casing formed on the rear side of said envelope that includes an inner surface and an outer surface, the outer surface of said casing being formed from a loop portion of hook and loop tape fastener material, said one or a plurality of pockets thereby being alternatively attachable to said waist belt either by slidable engagement of said waist belt within said casing or by affixation of the outer surface of said casing with an outside surface of said waist belt.

2. A device for portable storage and transportation of fishing gear and personal items comprising
   a waist belt having an outside surface formed from a hook portion of hook and loop tape fastener material extending for an entire length of said waist belt and an inside surface formed from a loop portion of hook and loop tape fastener material extending for an entire length of said waist belt;
   one or a plurality of pockets selectively attachable to said waist belt, said one or a plurality of pockets comprising a selectively fastenable envelope having a casing formed on the rear side of said envelop that includes an inner surface and an outer surface, the outer surface of said casing being formed from a loop portion of hook and loop tape fastener material, said one or a plurality of pockets thereby being alternatively attachable to said waist belt either by slidable engagement of said waist belt within said casing or by affixation of the outer surface of said casing with the outer surface of said waist belt, said envelope further including an envelope flap having an inside surface and an outside surface, said envelope flap being selectively fastenable by means of hook and loop taspe fastener means, a hook portion of said hook and loop tape fastener means being fixedly attached to the inside surfaces of said envelope flap and a loop portion of said hook and loop tape fastener means being fixedly attached to an outside surface of said envelope; and
   one or a plurality of loop hangers selectively attachable to said waist belt, said one or a plurality of loop hangers comprising an open loop having ends of said loop interconnected by pin means which fixedly attach ends of said loop hanger in spaced relationship and a hanger clip rotatably disposed about said pin means.

3. A device for portable storage and transportation of fishing accessories and personal items as described in claim 2 wherein said one or a plurality of pockets is formed from waterproof canvas material.

4. A device for portable storage and transportation of fishing accessories and personal items as described in claim 2 wherein said one or a plurality of pockets is formed from waterproof awning material.

* * * * *